US007249050B1

(12) United States Patent
Walker et al.

(10) Patent No.: US 7,249,050 B1
(45) Date of Patent: Jul. 24, 2007

(54) VENDING MACHINE SYSTEM AND METHOD FOR ENCOURAGING THE PURCHASE OF PROFITABLE ITEMS

(75) Inventors: Jay S. Walker, Ridgefield, CT (US); Daniel E. Tedesco, New Canaan, CT (US); Andrew S. Van Luchene, Norwalk, CT (US); Keith Bemer, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/345,092

(22) Filed: Jun. 30, 1999

Related U.S. Application Data

(63) Continuation-in-part of application No. 09/164,670, filed on Oct. 1, 1998, now Pat. No. 6,324,520, which is a continuation-in-part of application No. 09/012,163, filed on Jan. 22, 1998, now Pat. No. 6,397,193, which is a continuation-in-part of application No. 08/947,798, filed on Oct. 9, 1997, and a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670, application No. 09/164,670, which is a continuation-in-part of application No. 08/947,798.

(51) Int. Cl.
*G06Q 30/00* (2006.01)

(52) U.S. Cl. .................. 705/14; 705/10; 705/16; 705/22; 700/231; 700/232; 700/238

(58) Field of Classification Search .................. 705/14, 705/26, 10, 16, 22; 700/231, 232, 238
See application file for complete search history.

(56) References Cited

U.S. PATENT DOCUMENTS 2,607,463 A * 8/1952 Saigh, Jr. .................. 194/220

(Continued)

FOREIGN PATENT DOCUMENTS

EP  0 856 812 A2  8/1998

(Continued)

OTHER PUBLICATIONS

Conlon et al. "Press 1 for profit," Sales & Marketing Management. Sep. 1998.*

(Continued)

*Primary Examiner*—Eric W. Stamber
*Assistant Examiner*—Tri Nguyen
(74) *Attorney, Agent, or Firm*—Walker Digital Management, LLC

(57) ABSTRACT

This invention relates generally to systems and methods for delivering products-on-demand to individuals and, more particularly, to delivery via vending machines. In accordance with a preferred embodiment, the method of the instant invention is initiated when a customer makes an initial product selection. Based the customer's product choice, a determination is made as to whether or not that product qualifies for an alternate product offer. If it does not so qualify, the customer's original selection will be dispensed and the transaction ends. On the other hand, if the product does so qualify, the customer will be presented with an offer message that suggests that he or she should try an alternative product. Typically, the product that is offered as an alternative will be the one whose sale is most beneficial to the vending machine operator, e.g., the one yielding the greatest profit. If the customer accepts the alternate offer, the alternate product will be dispensed. However, if the customer declines the alternate product offer, the originally requested item will be vended. The particular circumstances under which an alternate product offer is presented to the customer are quantified by representing them as a collection of rules, the evaluation of which depends preferably on previously collected sales data.

11 Claims, 5 Drawing Sheets

U.S. PATENT DOCUMENTS

| | | | |
|---|---|---|---|
| 3,442,422 A * | 5/1969 | Neidig | 221/94 |
| 4,412,292 A | 10/1983 | Sedam et al. | |
| 4,551,935 A | 11/1985 | Bachmann et al. | |
| RE32,115 E * | 4/1986 | Lockwood et al. | 235/381 |
| 4,654,800 A | 3/1987 | Hayashi et al. | |
| 5,353,219 A | 10/1994 | Mueller et al. | |
| 5,368,129 A * | 11/1994 | Von Kohorn | 186/52 |
| 5,544,784 A * | 8/1996 | Malaspina | 221/135 |
| 5,592,378 A * | 1/1997 | Cameron et al. | 705/27 |
| 5,831,862 A | 11/1998 | Hetrick et al. | |
| 5,878,401 A | 3/1999 | Joseph | |
| 5,918,213 A * | 6/1999 | Bernard et al. | 705/26 |
| 6,052,667 A | 4/2000 | Walker et al. | |
| 6,324,520 B1 * | 11/2001 | Walker et al. | 705/16 |

FOREIGN PATENT DOCUMENTS

| | | |
|---|---|---|
| EP | 0 862 150 A2 | 9/1998 |
| WO | WO 97/08638 A1 | 3/1997 |
| WO | WO 97/28510 | 8/1997 |
| WO | WO 99/12117 A1 | 3/1999 |
| WO | WO 99/38125 A1 | 7/1999 |

OTHER PUBLICATIONS

Atsushi Nakayama, "Coca-Cola machines to be 'smarter'; The Teleterminal control system is aimed at keeping customers, and machines, satisfied", The Japan Economic Journal, Feb. 23, 1991, p. 22.

Tim Davis, "Vending suppliers scurry to meet Coke-mandated vendor communication", Automatic Merchandiser, Aug. 1996, pp. 62-64.

Allan Z. Gilbert, "Financial Management: A call to action for wireless data communication", Automatic Merchandiser, Aug. 1996, pp. 62-64.

"Coupon acceptor; Coinco", Beverage Industry, Jul. 1998, No. 7, Vol. 89, p. 38.

"Coinco offers BA-30 dollar bill acceptor", Automatic Merchandiser, Aug. 1998, p. 33.

Rich Karlgaard, "Keep your eyes on the prize", Forbes, Sep. 21, 1998, p. 43.

"Coupon acceptor", Beverage Industry, Dec. 1998, No. 12, vol. 89, p. 34.

PCT International Search Report for Application No. PCT/US00/13349, dated Nov. 9, 2000.

PCT International Preliminary Examination Report for Application No. PCT/US00/13349, dated Aug. 30, 2001.

* cited by examiner

| PRODUCT DESCRIPTION 310 | PRODUCT DISPENSER IDENTIFIER 320 | PRODUCT COST 330 | PRODUCT PRICE 340 | CURRENT DEMAND RATE 350 | QUANTITY REMAINING 360 | EXPIRATION/ RESTOCK DATE 370 |
|---|---|---|---|---|---|---|
| COKE® | A1 | $0.30 | $0.75 | 1 / 9 HOURS | 12 | 2/15/99 |
| DIET COKE® | A2 | $0.25 | $0.75 | 1 / 10 HOURS | 9 | 2/15/99 |
| SUNKIST® | A3 | $0.30 | $0.65 | 1 / 15 HOURS | 15 | 2/15/99 |
| SNACK 1 314 | B1 | $0.25 | $0.50 | 1 / 12 HOURS 354 | 21 | 2/20/99 374 |
| SNACK 2 | B2 | $0.20 | $0.50 | 1 / 11 HOURS | 21 | 2/20/99 |
| SNACK 3 | B3 | $0.20 | $0.65 | 1 / 10 HOURS | 14 | 2/20/99 |

| ORIGINALLY REQUESTED PRODUCT 410 | ALTERNATE PRODUCT 420 | APPLICABLE ALTERNATE PRODUCT OFFER RULES 430 | ALTERNATE PRODUCT OFFER MESSAGE 440 | HISTORICAL ACCEPTANCE RATE 450 | ACCEPTANCE SIGNAL 460 |
|---|---|---|---|---|---|
| A1 | A2 | N/A 431 | <C:\WAVE_FILE1> 441 | 70% | A2 |
| C_ | C_ | ALTERNATE PRODUCT MARGIN > ORIGINALLY REQUESTED PRODUCT MARGIN 432 | "WHY NOT TRY BRAND [_] INSTEAD? JUST PRESS C [_]." 442 | 57% | C_ |
| B1 | B2 | ALTERNATE PRODUCT QUANTITY > 5 REMAINING 433 | <C:\OFFER.MP3 443 | 29% | B2 |
| C1 | C3 | ORIGINALLY REQUESTED PRODUCT'S DEMAND RATE ≥ 1 / 5 HOURS 434 | "WHY NOT TRY BRAND [_] INSTEAD? JUST PRESS C3." 444 | 45% | C3 |
| C1 | C_ | ALTERNATE PRODUCT'S DEMAND RATE < 1 / 17 HOURS 435 | "WHY NOT TRY BRAND [_] INSTEAD? JUST PRESS C2." 445 | 47% | C_ |
| C2 | C3 | ALTERNATE PRODUCT'S EXPIRATION/ RESTOCK DATE < ORIGINALLY REQUESTED PRODUCT'S EXPIRATION/RESTOCK DATE 436 | "WHY NOT TRY BRAND [_] INSTEAD? JUST PRESS C3." 446 | 81% | C3 |
| C3 | C1 | ALTERNATE PRODUCT WILL EXPIRE IN 3 DAYS 437 | "WHY NOT TRY BRAND [_] INSTEAD? JUST PRESS C1." 447 | 72% | C1 |
| B2 | C3 | ALTERNATE PRODUCT'S ACCEPTANCE RATE > 90% 438 | "WHY NOT TRY BRAND [_] INSTEAD? JUST PRESS C3." 448 | 95% 458 | C3 |

VENDING MACHINE SYSTEM AND METHOD FOR ENCOURAGING THE PURCHASE OF PROFITABLE ITEMS

This application is a continuation-in-part of U.S. patent application Ser. No. 09/164,670, filed Oct. 1, 1998, for "METHOD AND APPARATUS FOR COLLECTING AND APPLYING VENDING MACHINE DEMAND INFORMATION", which issued on Nov. 27, 2001, as U.S. Pat. No. 6,324,520, which is a continuation-in-part of U.S. patent application Ser. No. 09/012,163, filed Jan. 22, 1998, for "METHOD AND APPARATUS FOR AUTOMATICALLY VENDING A COMBINATION OF PRODUCTS", which issued on May 28, 2002, as U.S. Pat. No. 6,397,193, which is a continuation-in-part of (a) U.S. patent application Ser. No. 08/947,798, filed Oct. 9, 1997, for "METHOD AND APPARATUS FOR DYNAMICALLY MANAGING VENDING MACHINE INVENTORY PRICES", and (b) U.S. patent application Ser. No. 08/920,116, filed Aug. 26, 1997, for "METHOD AND SYSTEM FOR PROCESSING SUPPLEMENTARY PRODUCT SALES AT A POINT-OF-SALE TERMINAL", which issued on Sep. 12, 2000, as U.S. Pat. No. 6,119,099, which is a continuation-in-part of U.S. patent application Ser. No. 08/822,709, filed Mar. 21, 1997, for "SYSTEM AND METHOD FOR PERFORMING LOTTERY TICKET TRANSACTIONS UTILIZING POINT-OF-SALE TERMINALS", which issued on Jul. 21, 2001, as U.S. Pat. No. 6,267,670.

FIELD OF THE INVENTION

This invention relates generally to systems and methods for delivering products-on-demand to individuals and, more particularly, to delivery via vending machines.

BACKGROUND OF THE INVENTION

Vending machines are well-known fixtures of modern life and may be broadly described as machines that dispense food, drinks, chewing gum, toys, toiletries, or some other type of merchandise in exchange for money or tokens. A principal advantage of dispensing products via vending machines is that they provide uninterrupted access to the goods contained therein, thereby allowing consumers to make purchases at times convenient for them. The vending machine operator also benefits in that the cost of providing an attendant to collect the money and distribute the goods is reduced to roughly the cost of purchasing or leasing and operating the machine. Sales volumes that would be much too low to justify hiring an attendant to distribute the goods can often be profitable for a vending machine operation.

Of course, unattended operation is both a strength and a weakness of a vending system. It is a weakness to the extent that a conventional vending machine cannot do what a human attendant might: attempt to influence the consumer's buying decision to benefit the owner's objectives. For example, a human salesperson might attempt to increase the profit obtained from a paying customer by suggesting that the customer should consider purchasing a different product than the one originally selected, a product that has a higher profit margin. Similarly, a human can try to direct customers toward a product item that is nearing its expiration date, so that the item might be sold before it must be pulled from the shelves and discarded. In brief, the sales attendant can attempt to dynamically influence the buying decision of a consumer during the sale process to suit the seller's needs.

It is, of course, the nature of a conventional vending machine to respond automatically and unthinkingly to a product selection request from a customer. However, this operating model may be inconsistent with the needs of the vending machine owner/operator, who might have a variety of products with differing profit margins or expiration dates loaded into the same machine. Instead, an operator might wish to emphasize the sale of one product over another for any number of reasons, but primarily in order to maximize his or her profit. Conventional vending machines, though, offer little help in this regard.

The vending machine arts have seen a good deal of innovation in recent years, but no one has yet addressed the problem introduced above, namely, how best to influence the buying decision of a ready, willing, and able buyer who has made an initial product selection. Some inventors have focused on approaches such as static displays aimed at influencing the customer's initial purchase decision before the sales transaction begins. See, e.g., Bachmann et al., "Display Panel for Vending Machines", U.S. Pat. No. 4,551, 935, and Hetrick et al., "Automatic Transaction System with a Dynamic Display and Methods of its Operation", U.S. Pat. No. 5,831,862. However, neither of these patents disclose or suggest alternate products to the customer after the initial product selection has been made.

Others are experimenting with vending machines that are in communication with a central computer via a network, thereby letting the company monitor inventory in distant locales and change prices dynamically in response to local demand. Among the contemplated uses for this machine include variable pricing based on the time of day, temperature, and the past demand for a product. However, under this model prices are changed "after the fact" at a point when it is too late to influence the purchase behavior of a currently ready, willing, and able buyer.

Still others have developed "revenue managed vending machines" that dynamically adjust prices according to substantially real-time readings of supply and demand. See, for example, the co-pending application by Tedesco et al., application Ser. No. 08/947,798, filed on Oct. 9, 1997, the disclosure of which is incorporated herein by reference. Revenue managed vending machines automatically make pricing decisions based on recent measurements of supply and demand, and their prices can potentially be altered after each purchase. The data received during a given transaction can be used to make the next transaction more profitable.

Other approaches to profit maximization include vending machines that are configured to offer "package deals" and "upsells", where high demand products may be advantageously paired with low demand products in a promotional effort to leverage the popularity of one product against distressed and possibly perishable inventory. These vending machines may additionally offer supplemental products to the buyer of an initial product in an effort to boost sales. However, both of these aspects require the buyer to purchase more than one product in order to obtain a discount; and neither presents an alternate product offer to a ready and willing buyer. Tedesco et al., in application Ser. No. 09/012, 163, filed on Jan. 22, 1998, which issued on May 28, 2002, as U.S. Pat. No. 6,397,193, teach one such vending approach, the disclosure of which is incorporated herein by reference.

Finally, co-pending U.S. application Ser. No. 09/164,670, filed Oct. 1, 1998, which issued on Nov. 27, 2001, as U.S. Pat. No. 6,324,520, the disclosure of which is incorporated herein by reference, teaches a vending machine that offers products to undecided customers and suggests substitute products when the originally selected item is out of stock. The substitute product can be designated by the operator, based on historical likelihood of acceptance, or based on average selection time. This general approach works to offer a substitute product only when the requested product is unavailable.

In summary no one has yet discovered a method by which the ready-and-willing buyer can be encouraged to take a product different from the one originally selected, with the alternate product being chosen so as to better optimize profitability of the vending machine owner/operator.

Heretofore, as is well known in the vending arts, there has been a need for an invention to address and solve the above-described problems. Accordingly, it should now be recognized, as was recognized by the present inventors, that there exists, and has existed for some time, a very real need for a vending system and apparatus that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a disclosure of a vending machine method and apparatus that is designed to optimize one or more operating parameters, such as profit, by offering an alternate product to an identified buyer after the buyer has made an initial product section. The product that is offered in the alternative will be one, which, typically, better addresses the objectives of the seller than the originally selected product. Accordingly, the inventive machine markets to customers during a sales transaction.

According to a first embodiment, the instant invention receives some indication that a buyer wishes to purchase a particular type of good. The customer typically indicates his or her choice by depositing finds into the machine and pressing a selection button on the machine's face. Based on this information, a microprocessor determines whether there is another product that might be offered to the buyer, which would yield more profit than the originally requested product. If there is none that is more profitable, the transaction concludes normally: the customer receives the selected item and any change due. However, if there is another product with a higher profit margin, an offer message is presented to the customer, which suggests that he or she should consider purchasing that product. The offer message is presented to the buyer through an output device such as a light emitting diode (LED) display. The buyer then responds by either accepting or declining the offer, after which the vending machine dispenses an item corresponding to either the original product selection or the alternate product according to the buyer's response. If the consumer accepts the alternate product offer, the vending machine operator will make more money on this transaction than he or she would have made if the original product had been vended as requested. Consequently, in the instant embodiment, the vending machine logic seeks to optimize the profit potential of a given transaction by offering alternate products to the customer during the sale that are more profitable than the original selection, and, especially, by offering the alternate product that is the most profitable.

The instant inventors have devised many variations of the approach described in the previous paragraph, wherein other criteria or decision rules are used to control the selection of alternate products. For example, the machine might be programmed to offer a specific alternate product whenever a buyer selects a particular product, i.e., rather than searching for a "best" available alternative. Additionally, the machine may be programmed to offer only certain classes of products in the alternative (e.g., only beverages might be offered as alternates if a beverage is originally selected, or only snacks if a snack is selected). Further, certain products may be offered in the alternative only if sufficient inventory of the alternate product is available. Even further, an alternate product may be offered if the originally requested product is a higher-demand product, and this is especially so if the stock-on-hand of the requested product is dwindling. Still further, a product may be offered as an alternative if its demand rate is lower, a rule that could be used to stimulate sales of slow-moving products.

Other preferred decision rules include extending an offer for an alternate product if the remaining shelf life of the alternative (as measured by, for example, the expiration date of items of that type in the machine) is less than that of the originally selected product. Similarly, no alternate product may be offered if the original selection has a shorter shelf life remaining than the contemplated alternative. Further, an alternate product may be offered if it is within a predetermined number of days of its expiration date. Similarly, an original selection that might otherwise qualify for an alternate offer will not have such an offer presented if, for example, the expiration date of the original product is within less than a predetermined number of days. Finally, the vending machine may be programmed to offer only those alternate products that have historically demonstrated a likelihood of being accepted if they are offered as alternatives.

In still another embodiment, the machine may be programmed to offer a discount on the alternate product as an inducement to the buyer to accept the alternative. This approach might be useful where there is a low demand product and the discount is offered to stimulate sales; or, where there are product items that have a limited remaining shelf life and the vendor is faced with the prospect of a total loss of the value of the product if it cannot be sold in time. The discounted price of the alternate product is preferably not shown to the customer until he or she requests a higher demand product. Thus, if the customer initially requests the lower demand or soon-to-expire product, the full price will be paid for it.

Another variation of the previous embodiment could be used when the original and substitute items are approximately equal in retail price. In that case, the system would preferably offer the substitute product at a discount. Then, at the conclusion of the transaction, the change owed to the customer would typically be dispensed as usual, the returned change including the amount of the discount, if the customer had accepted the offer. However, rather than returning cash to the customer. The previous examples have all been directed toward offers that are presented (or not) to the customer and, after the customer receives the merchandise, the transaction ends. However, the general framework described previously may also be used to influence, not just the current transaction, but future transactions as well. For example, the vending machine may be designed to offer an incentive to purchase a product again in the future if the customer agrees to take an alternate product now. A preferred form of this incentive is a discount on a future purchase. This might be implemented by providing the customer with an alphanumeric coupon code that could be entered into the machine at a later date for redemption of the future discount. It might be desirable in some settings to return a (magnetic) coupon equal to the amount of the change; equal to some multiple of the amount of change (e.g., 110% of the amount of the discount); or, even a coupon good for a "free" item. The free item coupon could be redeemed at a later date for a product specified by the vending machine operator, a product that would typically be most profitable to the operator. Alternatively, a coupon might be issued for a "mystery item", and the customer would not know until the time when it is redeemed exactly which product he or she would be receiving. Such a code could be manually entered into an input device such as a keypad or entered via optical scanner (e.g., a bar-code reader or entered through the use of a magnetic strip coupon reader). In the preferred embodiment, the code would be expiring and would include an indication of the expiration date within the code itself, so that a database of such offers need not be maintained, although maintenance of such a database would certainly be possible and feasible, as would be apparent to one of ordinary skill in the art.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to cover all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which:

FIG. 3 illustrates some preferred data items that would be used to determine whether an alternate product should be offered;

FIG. 4 illustrates the operation of various of the alternate product decision rules discussed herein; and, FIG. 5 contains a flow chart that illustrates steps of the instant invention.

DETAILED DESCRIPTION OF THE
INVENTION HARDWARE COMPONENTS

Figure 1:
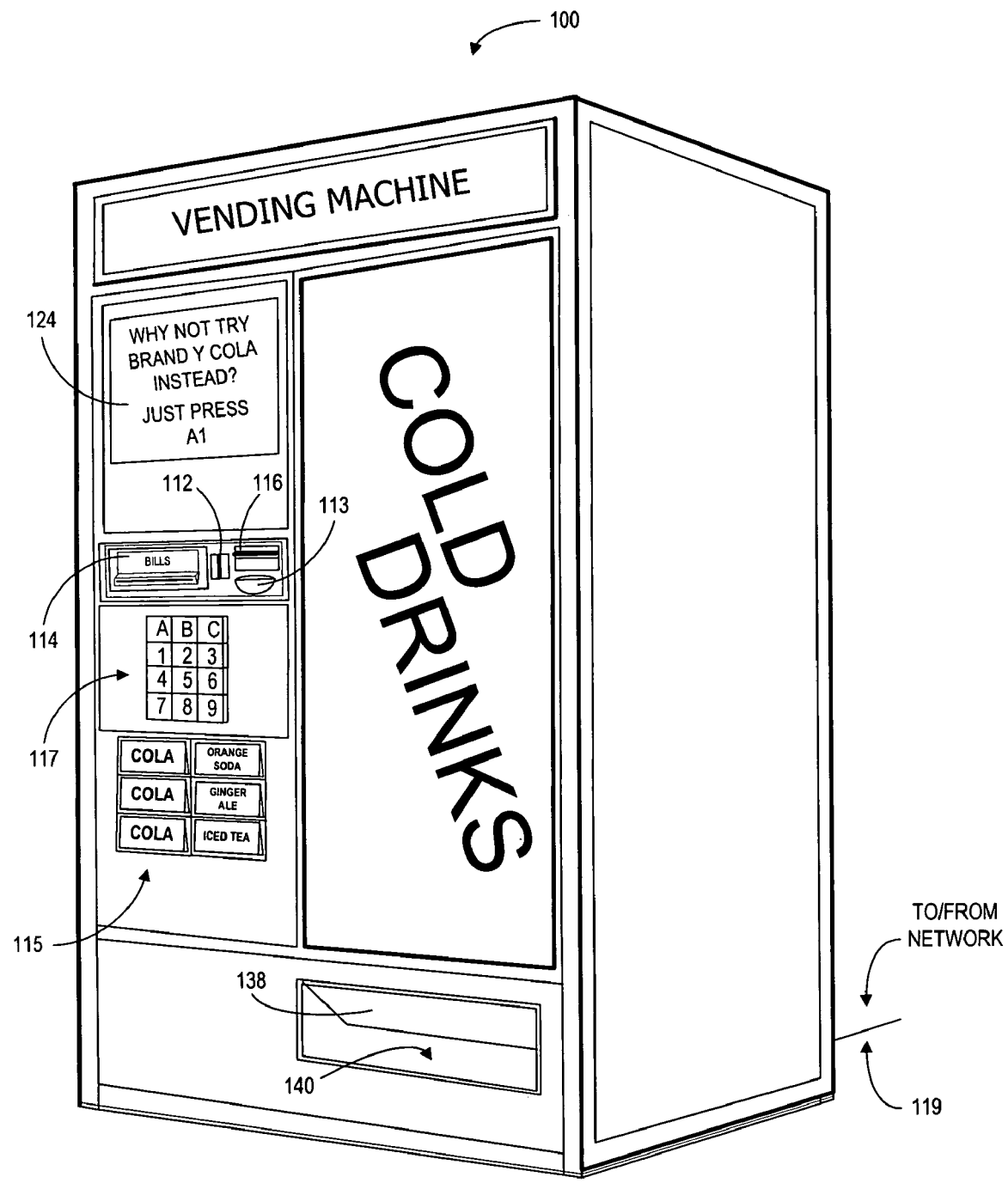
FIG. 1 illustrates front perspective view of the instant invention as embodied in a vending machine apparatus.

A vending machine 100 that would be generally suitable for implementing the instant invention is illustrated in FIG. 1. It should be noted that the term "vending machine" will be used herein in the broadest sense of the term to include any automatic sales device: that accepts payment from a consumer; that can sense a consumer choice; and, that dispenses at least one of a plurality of types of goods in accordance with the wishes of the consumer. The term "good" will also be used in its broadest sense to include the broad range of traditionally vendible products—e.g., food, beverages, novelties, etc.—as well as less traditional interpretations such as money (which is "vended" by a bill dispenser) and services (e.g., which are "vended" by phone machines).

In FIG. 1, the vending machine 100 is shown as containing such familiar fixtures as a bill reader/validator 114 and a coin slot 112 for accepting payment from the customer, a change bowl 113 to catch any change that is returned to the customer, and a product return well 140 (protected from the weather and from theft by flap 138) for dispensing the product to the customer. Card reader 116 provides the customer with another method of payment and is preferably at least able to read smart cards or credit/debit cards. The familiar product selection matrix 117 and/or product selection buttons 115 are provided so that the customer can signal a product choice to the vending machine and respond to queries therefrom.

In addition to the standard items described previously, the preferred vending machine external configuration preferably includes additional components such as a network connection 119 and an output device 124, which has been illustrated for purposes of specificity in FIG. 1 as a scrolling LED display.

Device 124 allows the CPU 126 to present various messages to the customer. In the preferred embodiment, output device 124 would be an LED-type display and might further include an audio speaker. However, it could also be, for example, a conventional video monitor, a touch-sensitive video monitor, or a printer. In brief, output device 124 is any device or combination or devices suitable for communicating a visually perceptible (including printed) or audible message to the customer.

Although FIG. 1 suggests that network connection 119 is a conventional land communications line (e.g., a telephone line, fiber optic line, coaxial line, twisted pair line), this connection could also be any of a variety of wireless connection types that are well known to those skilled in the art (e.g., wireless telephone, infra red communications, microwave transmission, or radio frequency transmissions).

Figure 2:
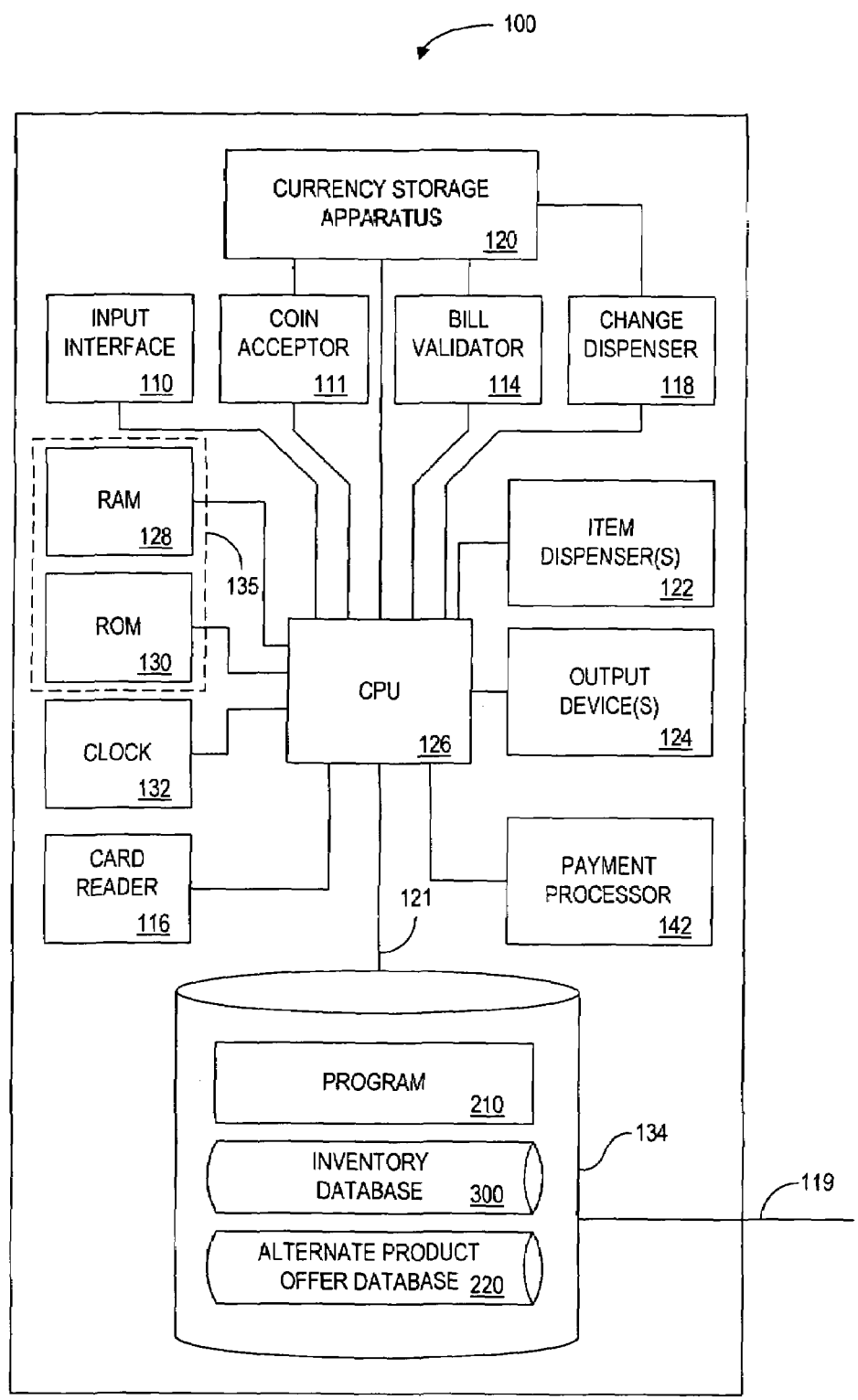
FIG. 2 contains a schematic diagram of the preferred hardware components of the vending machine embodiment of the instant invention.

Turning now to the internal workings of the vending machine 100, as is illustrated in FIG. 2, microprocessor ("CPU") 126 has access to and controls a number of additional internal devices not readily apparent to a customer. For example, the CPU 126 preferably controls the change dispenser 118, which returns specific amounts of money to the customer via change bowl 113. Currency storage apparatus 120 receives bills from the bill reader/validator 114, and coins from the coin slot 112 by way of coin acceptor 111, all of which are preferably in electronic communication with the CPU 126. Determination of whether the customer has paid too much, paid too little, or has tendered the correct amount is preferably made within payment processor 142. The CPU 126 will need to be in communication with and control the item dispenser 122, as this is the means by which the CPU 126 causes a particular product to be dispensed to the customer via item dispenser(s) 122.

Input interface 110 provides access by the CPU 126 to external customer selection signals originating on the front panel of the vending machine 100. These customer selection signals might originate from the product selection matrix 117, the product selection buttons 115, or from any other input devices on the exterior of the vending machine (e.g., output device 124, if that device is a touch-screen monitor or if it incorporates a microphone for use in speech recognition).

The CPU 126 will preferably have local access to computer memory 135 in which are stored computer instructions and data for recall and use by the CPU 126. Memory 135 may be any combination of volatile and/or nonvolatile memory (such as computer RAM 128 and computer ROM 130). Computer memory 135 preferably contains at least a minimal boot program, which is executed when the CPU 126 is powered up or reset.

Additional storage 134 is also provided for use by the CPU 126 and, in the preferred embodiment, this will be some sort of hard disk, but could also be, for example, computer RAM or computer ROM, a PROM chip, flash RAM, a ROM card, a RAM card, a floppy disk, a magnetic tape, a magneto-optical disk, an optical disk, a CD-ROM disk, or a DVD disk. Note that the storage 134 might be physically resident inside of the vending machine or accessible over a network connection via communications conduit 121 and/or network connection 119. Indeed the CPU 126 itself might be located remotely and control operations within the then-remote vending machine via network connection 119 and/or communications conduit 121.

Within the storage 134 would typically be found the computer instructions (i.e., one or more computer programs 210) necessary to implement the instant methods. Additionally, it is contemplated that the inventory database 300 and alternate product offer database 220 (both discussed below) would both be kept within this storage.

Finally, the instant invention preferably includes a clock/time circuit 132 in electrical communication with the CPU 126. This component provides the current date and time to the CPU 126 when required. It is additionally preferred that the clock circuit 132 be located within the vending machine 106, but that is not strictly required and network connection 119 could be used to provide remote access to this functionality.

In normal operation, a customer will initiate a transaction by making a product selection using keypad 117 (FIG. 1), item selection buttons 115, or via some other signaling scheme (for example, via a cell phone). It is preferred, though not required, that the consumer deposit an amount of money necessary to cover the cost of the selection before signaling his or her product choice. However, the instant system could be arranged to work in the instance—indeed, even to exploit the situation—where the customer has not tendered any money or has tendered an amount that is inadequate to purchase the selection.

The CPU 126 senses the customer's signals via input interface 110 and identifies the initial product section. Based on the initial selection, the CPU 126 might send one or more messages to the customer through output device 124. The customer will be given an opportunity to respond to the message and that response will be read by the CPU 126 via input interface 110. After the customer has made his or her wishes known, the transaction is completed by causing the agreed-upon product to be dispensed via item dispenser 112 and by returning any change owed to the customer. The vending machine is then ready for a next sale.

Vending Logic

In brief, the instant invention is designed to interact with the consumer after an item selection has been made by offering an alternate product to the customer. The alternate product of choice may be one that would be more profitable to the vending machine owner than was the original selection. The conditions under which the alternate product is offered are controlled by one or more rules, which are preferably stored in an alternate product offer database.

Figure 5:
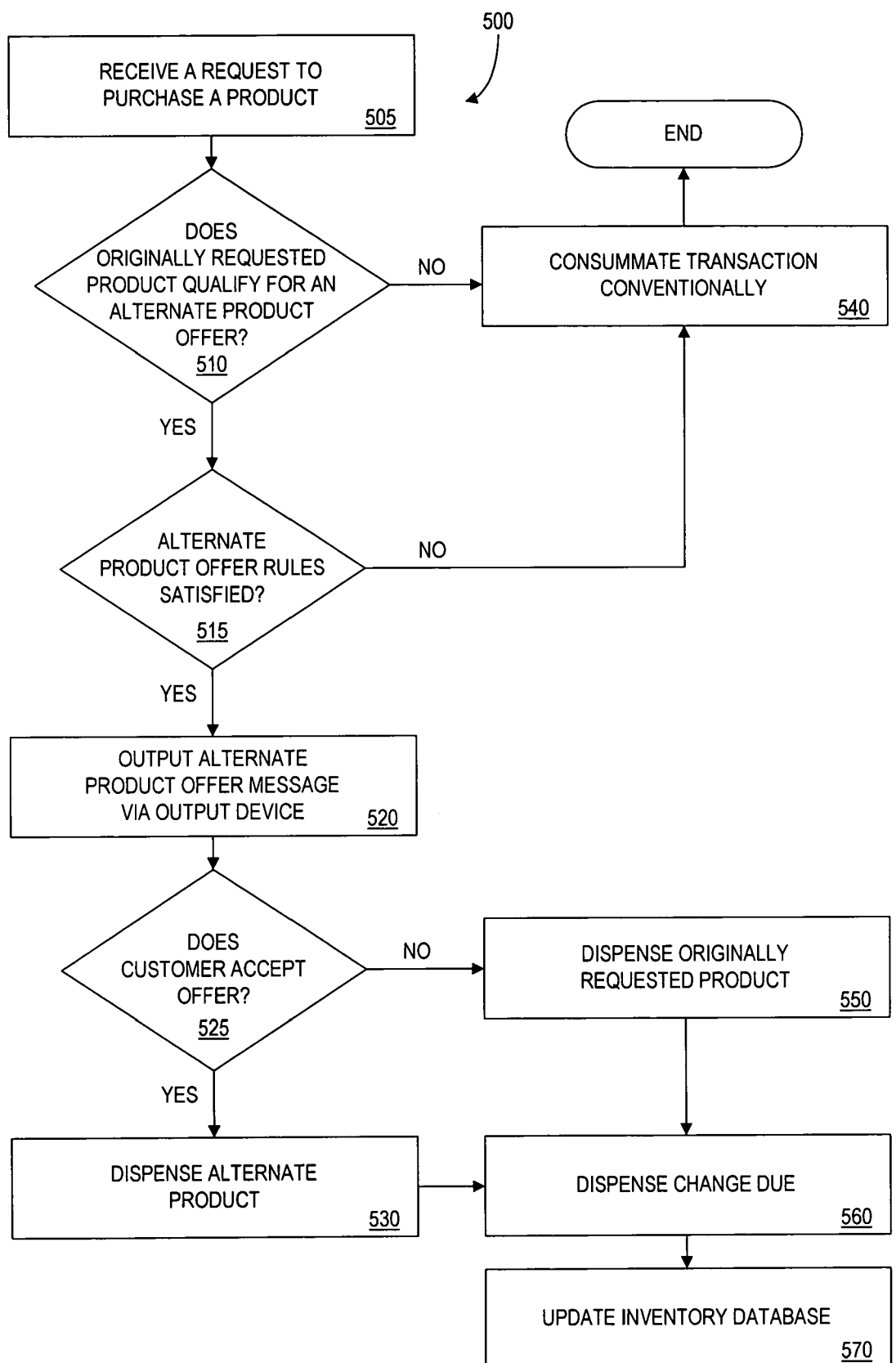

According to a preferred aspect of the instant invention, and as is broadly illustrated in FIG. 5, the instant method 500 begins with a request by a customer to purchase a product (step 505) dispensable by the vending machine 100. This request might also be accompanied by payment at the inception of the transaction, although that is not required and the instant method would proceed identically as described hereinafter, except, of course, that no product would be dispensed until adequate funds are deposited.

After receiving a product request from the customer, the instant method continues by determining whether the originally selected product qualifies for an alternate product offer (step 510), which step is preferably determined by consulting the alternate product offer database 220. This database 220 is preferably stored locally within the vending machine 100, however it could also be remotely accessed via communications conduit 121 and/or network connection 119. From this database 220, the qualifying product offers associated with or implicated by the original selection will be selected.

For purposes of the disclosure herein, a qualifying alternate product is any product that the vendor might want to offer a customer as an alternative to an original selection: any product implicated by a rule. In one embodiment, a qualifying alternate product offer is associated with a combination of a decision rule and an "Alternate product offer message." The decision rule states the circumstances under which the alternate product is to be offered. The "Alternate product offer message" contains the information that is presented to the consumer when all of the rule conditions are satisfied.

It may be that there are no offers in the database 220 that are associated with the original selection, in which case the sale will culminate conventionally (step 540). Or, there may be more than one alternate product that qualifies for presentation to the customer. In the later case, it is preferred that a single alternative be selected from among them and presented to the customer. Other variations are discussed below.

Once a single rule/offer message combination has been selected, the next step is to determine if the predicate conditions of the rule are satisfied (step 515). In the preferred embodiment, the vending logic operates according to the following general scheme:

Select a RULE associated with the original product selection;
Evaluate the RULE;
  If conditions of the RULE are satisfied, then
    Offer an alternate product;

Obtain customer's response to the offer; and,

Dispense the product chosen by the customer;

ELSE

Vend the product originally requested;

END IF, where RULE is any criterion, the state of which can be ascertained or estimated by the CPU 126. For example, if the CPU 126 is presented with a rule that directs it to offer an alternate product if the number of product items remaining of the alternate product is greater than 5 (FIG. 4, cell 433), a preferable first step is to determine the quantity remaining of the alternate product. Then, if this criterion is met (i.e., six or more items of this type remain in the vending machine 100), the customer is presented with an alternate product offer (step 520). On the other hand, if the criterion is not met, the second branch of the previous conditional expression would control and the originally selected product would be dispensed (step 550).

After the alternate offer message is presented, the vending machine 100 waits for a response from the customer. During that the time that the vending machine 100 is waiting, it could, for example, flash a light behind the alternate product selection button to assist the customer in locating it. Or, an animated graphic image of a hand pressing a button corresponding to the alternate product might be shown to the customer on display device 124.

The customer's response could take many forms, but typically one of three sorts of responses would be expected. In the first case, the customer might respond by doing nothing, i.e., not responding to the offer. This case could be recognized by measuring the length of time that has passed since the presentation of the alternate offer. If the measured response time were longer than, e.g., fifteen seconds, the originally requested product would preferably be automatically vended (step 550).

In a second—and most typical—case, the customer will either accept or decline the offer in the manner suggested by the product offer, i.e., by following its directions. That is, the customer might press a "YES" or a "NO" button to accept or decline the offer (these buttons could be hardware switches located on the face of the vending machine, or regions on the face of a touch-sensitive display, e.g., output device 124 in FIG. 1). Or, the customer might respond by making a selection from the keypad 117 or product selection buttons 115. That response could be an affirmation of the original choice (thereby declining the offer) or a selection corresponding to the alternate product. Further, the customer might speak his or her response into a microphone (generally input device 110), if voice recognition software is being employed and the customer is directed to respond in that matter.

Finally, an example of a third type of response would occur if the customer selected a product type different from both the original selection and the proposed alternate: if the customer did not follow instructions. More specifically, this situation would arise if Product A was the original selection, and Product B was offered in the alternative, but the customer selected Product C in response. In that case, the preferred vending machine 100 response would be to ask the customer to confirm this new choice in order to guard against the event the selection was accidental. The product dispensed would then be the one selected by the customer at this last step. Of course, many variations of this scheme are possible, including offering still another product alternative if the late-selected product so-qualifies.

No matter what form the customer's response takes, the CPU 126 will sense the response and direct the vending machine item dispenser 122 to vend the appropriate type of product (steps 550 or 530, as appropriate). Additionally, the customer's change (if any) will be dispensed 560 and an inventory database will preferably be updated 570 to reflect the removal from inventory of that particular product item.

Alternate Product Offer Database

In the preferred embodiment, alternate product offers and associated rules are stored within the alternate product offer database 220. As is illustrated by example in FIG. 4, a variety of different rule/message combinations might be maintained within this computer file 220, which is preferably stored locally within vending machine 100, but which could alternatively be kept at a central location and accessed via network connection 119.

The message that is presented to the customer could be any combination of visual and auditory information that is suitable for communicating the offer. The message could be presented in simple block text or by animated graphical images. It might also be spoken words that are digitized and stored on disk as, for example, ".WAV" (wave) or ".MP3" sound files (i.e., compressed audio files). Of course, the offer might also be formulated using any combination of the above. The language in which the offer is presented might be varied depending on the location of the machine or at the option of the customer. Additionally, music or some entertaining graphical display might be played for the customer on output device 124 while he or she is contemplating the offered alternative.

Finally, it should be noted that, especially in view of the foregoing, the exact components of output device 124 will depend on the type and format of the message, which is to be delivered to the customer. In general, the output device 124 should be taken to include whatever video and audio components are necessary to present the offer message in the appropriate format.

Alternate Product Offer Rules

Decision rules that are suitable for use with the instant invention could take many forms, some examples of which are presented in FIG. 4. Generally speaking, the outcome of a rule evaluation depends on the status of some quantity that can be estimated or determined by the CPU 126. Thus, it is preferable that the CPU 126 have access to the sorts of parameters listed in FIG. 3: parameters that are related to the operating environment of the vending machine 100.

In FIG. 4, the customer's original product selection appears within column 410. The alternate product (or alternate type or brand of product) appears in column 420. The circumstance under which the alternate product of column 420 will be offered (a "rule") is found in column 430. The message that is presented to the consumer if the selected product qualifies for an alternate offer is found in column 440. Column 450 contains the historical acceptance rate of each alternate product (or product family) as compared with another. This is an example of information that could be made a part of either the "Alternate product offer database 220" or the inventory database 300. Finally, the preferred signal by which CPU 126 recognizes that the customer has accepted the offer is indicated in column 460.

In the first row of FIG. 4, Rule 431 is the fundamental consideration rule "always offer A2 when A1 is selected." Thus, whenever a customer selects A1 a message 441 offering A2 as an alternative will be presented to the consumer (subject possibly to other fundamental considerations—such as product availability, discussed below). Note that a substantially equivalent variant of this rule is "always offer A2", which presents the offer message for the alternative A2 whatever the original product selection (except, of course, when the original product selection is A2). Finally, in this particular case, the offer message takes the form of an audio message that is "played" to the customer via an audio speaker (generally, output device 124). The "wave" computer file of message 441 is one of many computer disk file formats suitable for storing recorded sounds, such as spoken messages, in a digital form.

Turning now to another sort of rule that would be appropriate for use with the instant invention, Rule 432 is designed to allow the presentation of an alternate product chosen from the same group or class of products as that selected by the consumer. This decision rule offers a different selection from the "C" column of keypad 117 (FIG. 1), whenever the original section was from the "C" column, and when the alternative has a higher profit margin. Items within the same keypad 117 column will typically be the same type of product, e.g., beverages, or snacks. Thus, if the customer originally selected a beverage, a different beverage would be offered in the alternative, provided, of course, that the alternate beverage had a higher profit margin. Similarly, if the original selection had been a snack, an alternate snack would be offered, the alternative being selected so as to yield a higher profit for the vending machine operator. If the original product selection had a higher profit margin than the designated alternatives, under this rule the selected product would be immediately dispensed. Finally, the suggested message text 442 ("WHY NOT TRY BRAND[_]INSTEAD? JUST PRESS C[_]") could be presented to the consumer via any display device suitable for the display of textual and/or graphical material. The underscores in the previous message represent empty fields that would be filled in by the CPU 126 to communicate the message implicated by the previous rule.

Rule 433 illustrates a situation that might arise when the vendor seeks to reduce the inventory of a product that is overstocked relative to other products in the machine 100. More particularly, presentation of the alternate offer message 443—which is an MP3 file, in this instance—will occur if the proposed alternative has some particular amount of inventory remaining (greater than five units remaining in the instant example). The particular alternate product chosen might be fixed, or one that is determined dynamically based on currently available stock in the machine, e.g., the product within the class of designated alternative products that has the greatest remaining inventory.

Turning now to rule 434 of FIG. 4, this rule provides an example of how decision rules can be dynamically modified to respond to local demand fluctuations. In the instant example, an alternate product will be offered if the originally selected product is in "high" demand, where "high" is, of course, subject to a broad range of interpretation. Rule 434 indicates that an alternative will be offered if the demand rate of the originally selected product is greater than one unit sold per five hour interval. The effect of this sort of rule is to preserve the existing inventory of a high-demand product by directing some of its sales toward other items. This would help preserve the existing high-demand inventory for the brand-loyal consumers, who may refuse to purchase anything at all if the selected product is not available. Additionally, a rule of this sort could tend to equalize the demand across the alternate products, and could reduce the number of instances where a vending machine operator is forced to travel to a machine to replenish the inventory of a single out-of-stock item.

Rule 435 is designed to help remedy a situation that is the reverse of rule 434. In this case, an alternate product is offered or not depending on the demand rate (cell 435) of the alternate product. This sort of rule could be used to stimulate the sale of slow-moving product items—i.e., those items having a demand rate that is "low" by some measure. In the instant example, after the consumer has manifested his or her intent to purchase a product, an alternate product that has a low demand rate (e.g., an average of less than one item sold per 17 hour period) will be selected for presentation. Of course, there are many ways that the alternate product might be chosen, but in the preferred embodiment under this rule the product having the lowest demand rate within the class of allowed alternatives will be presented to the customer.

Rule 436 is evaluated by reference to the product expiration or restock dates of the originally requested and alternate products. In the preferred embodiment, if the selected product has a later expiration date (i.e., a longer time until expiration) than a potential alternative, the alternative will be presented to the consumer by way of a message similar to product offer message 446. Of course, the vending machine might contain products with a variety of expiration dates, in which case the preferred approach would be to select as an alternate product the product with the earliest expiration date (i.e., the least time until expiration), although other variations of this approach are certainly possible. Additionally, and as is well known to those skilled in the art, it is not uncommon for items of the same product type to have differing expiration dates. In that case, it would be preferable to use the expiration date of the next vendible item for purposes of the previous rule. This assumes, of course, that the next vendible item has the earliest expiration date among those items having different expiration dates (i.e., the next item to be vended is the oldest item). This may or may not be the case in practice, and it should be clear how the previous approach could be modified to accommodate that situation.

As another example, Rule 437 is designed to help reduce the inventory of items that are nearing the end of their shelf life as measured by the product expiration date. This rule differs from the previous rule 436 in that only the expiration date of the alternate product is considered. That is, rule 437 illustrates a case where the decision to offer an alternate product hinges solely on the number of days until expiration of the alternate product, rather than the number of days until expiration of the originally selected product.

Finally, Rule 438 can be used where the operator seeks to capitalize on the tendency of customers to accept the alternate product offer. Rule 438 is satisfied if the acceptance rate of the alternate product—when offered in combination with the original product selection—is greater than some predetermined value, here greater than 90%. So, an alternate product will be offered under this rule only if customers have traditionally tended to accept the alternative. In the preferred embodiment, the acceptance rate is a parameter that is loaded into each vending machine from a remote computer via network connection 119. This parameter could reflect local, regional, or national alternate selection experience and might be compiled from many thousands of vending machine transactions. Of course, it is possible that each machine could separately estimate an acceptance rate value based on its own "experience" in offering alternative pairs of products, and this sort of arrangement has been specifically contemplated by the instant inventors. Note, however, that if there are "N" products that might be offered as alternatives, a full complement of historical acceptance rates covering all possible product offer combinations would require the specification of $N(N-1)/2$ rates. Since it might require a very long period of time for an individual vending machine to collect reliable acceptance data on all possible combinations of alternate products, it might be preferable to supply this information to the vending machine as a fixed parameter.

Turning now to some additional types of rules not illustrated in FIG. 4, rules can be formulated that utilize the clock 132 to fashion lunchtime, weekend, holiday, and/or time limited promotional rules. By way of example, eggnog could be offered as an alternative for any choice during the holiday season; coffee might be suggested during cold-weather months; or certain alternate products could be offered on a time-limited basis for test marketing or promotional purposes.

As a further example, a vending machine owner might want to encourage the purchase of one product brand over another. For example, if Brand B is offering a financial incentive to sell its products, the vending machine owner might wish to formulate a rule that would always offer a comparable product manufactured by Brand B if a Brand C product were selected by the customer. A representative message presented to a customer who chose a Brand C selection, might read something similar to "WHY NOT TRY A BRAND B PRODUCT RATHER THAN A BRAND C PRODUCT?" This message would be presented each time a customer selected a Brand C product.

Note that in the previous examples, the price of the product to the consumer has been regarded as fixed, however, that need not always be the case. The vending machine operator may wish to manipulate the price of an alternate product to increase its attractiveness to the customer, and the instant rule-based system provides an easy way to accomplish this end. Of course, this might be done any number of ways, but in the preferred embodiment the product offer message would include an offer for a discount on the alternate product. For example, if the customary price of item C3 is $0.75, the alternative product offer message might read as follows:

"WHY NOT TRY BRAND B AT $0.65 INSTEAD? JUST PRESS C3" Clearly the offer message associated with any rule could be similarly modified. It should be noted that in the preferred embodiment, the discount will not be revealed until the customer actually makes a product selection. Thus, the customer who initially selects the alternate product (C3 in the current example) will pay full price.

Other price-related rules are also possible and have been contemplated by the instant inventors. For example, consider a rule that is dependent on the amount of money tendered by the customer. In those instances where the customer has tendered an amount in excess of the price of the selected product (e.g., if one dollar has been deposited for a $0.75 item) the machine might be programmed to suggest a more expensive alternative, thereby returning less (or no) change to the customer if the offer is accepted. The alternate product might even be one that sells for more than the excess amount tendered, in which case the customer would typically be asked to deposit additional money or, depending on the precise nature of the controlling rule, given the opportunity to purchase the alternate product for an amount equal to the amount of money already deposited into the machine, such that the customer will be offered a discount for the purchase of the alternate item.

There are many more variations of the above rules than could possibly be listed herein and the previous examples have been selected only to illustrate a few ways that alternate product offer rules can be fashioned to help a vendor maximize the profit obtained from a vending machine. Clearly, one of ordinary skill in the art could devise many other sorts of such offers that are within the spirit and scope of the present invention.

More Complex Alternate Product Offer Rules

The previous text has been largely concerned with product offers and associated rules that involve only a single alternate product. Obviously, many variations and extensions of this approach are possible. For example, it should be clear that more than one alternate product might be offered in series to the customer. For example, if the customer declines the first alternate product offer, a second alternative could be presented, followed by a third, etc. However, that strategy would need to be balanced against the tolerance of the customer to such presentations: customer frustration might be expected to limit the number of sequential alternatives that could reasonably be presented. Also, such a strategy would need to be balanced against the increase in time that it would take to serve customers: subsequent customers waiting for the first customer to finish might get frustrated if the offeree takes a long time to choose an offer.

As another example, more than one alternative product could be presented in a single product offer message. (This sort of offer might read something like "HOW ABOUT TRYING A OR B INSTEAD.") Customer responses to this multiple offer would preferably be handled as described previously in connection with single product offers.

Note that it is also possible to modify some of the "simple" rules suggested previously, by conditioning the offer on the status of a second variable, thereby creating "composite" rules. For example, a decision rule that would normally direct customers away from products whose inventory is running low might be modified to additionally consider the demand rate for that product. Consider the following broad rule that might be applicable to all products: offer an alternate product if the inventory for the originally selected product is fewer than five items. That rule might be modified to consider the demand rate (and/or restocking) date for the selected item. Thus, if the customer selects a product that has a low demand rate (say, 1 item per week) and a low inventory (say, four items), it might be best to dispense the originally selected product without presenting an alternative. Similarly, the expiration date of the originally selected product might dictate that it should be dispensed without presenting an alternative product in spite of the fact that its inventory is low. This strategy would be appropriate if, for example, expiration were scheduled to occur the next day. This is because it is generally preferable to sell out of the product, rather than to have to discard the expired inventory items.

Another composite rule that could be useful in some circumstances involves modification of the rule that calls for a switch to a "lower" demand product if the originally selected product is in "high" demand. In some cases, a broad rule based on this criterion should be modified by considering the demand rate and/or current inventory of the proposed alternate product: it may not make sense in some cases to offer a predetermined alternate product if the alternative is also a high demand product, albeit slightly lower in demand than the originally selected product. So, one possible modification of the broad rule would be to select the product with the lowest demand rate among some set of feasible alternatives. However, if the inventory of the proposed alternate product is nearly depleted, it might make sense to select still another alternative (or give the customer the originally selected product) rather than offer the product that the associated rule originally called for.

Another sort of decision rule that could prove to be useful in some cases is a "simple" rule that operates on systematically adjusted parameter values. For example, consider a case where the profit margin of an item is varied according to the number of days until its expiration date. More specifically, it is contemplated that in some situations it would be advantageous to artificially increase the profit margin of a product as it nears the end of its shelf life, i.e., to inversely link profitability and perishability. This would be done to insure that, in rule comparisons involving profit margin, the near-expiring product would always be offered. This rule could be expressed as follows: offer the alternate product if the adjusted profit margin of the alternate product is greater than the profit margin of the original selection. This adjustment could be made in discrete steps or according to a continuous mathematical formula such as:

Adjusted profit margin=profit margin+0.01*(30−number of days till expiration), which will artificially increase the profit margin of this product one cent each day. Of course, each time such an artificial increase is applied, it will make it more likely that this product will qualify for an offer presentation (as compared with fixed profit margin items).

The previous examples have been directed toward situations in which an alternate offer is presented (or is not presented) to the customer and, after the customer receives the merchandise, the transaction ends. However, this same rule-based framework may be used to influence future transactions as well. For example, the previous logic may readily be modified to offer a customer an incentive to purchase a specified product in the future in exchange for the customer's purchase of the alternate product. In the preferred embodiment, the incentive would be a financial one, involving a discount on a future purchase. In the event that the incentive is a future discount, this sort of operational logic may be compactly represented as follows:

Select a RULE associated with the original selection;
Evaluate the RULE;
If the conditions of RULE are satisfied, then
Offer an alternate product and a future discount;
Obtain customer's response to the offer;
Dispense the product chosen by the customer; and,
If the alternate product was chosen, then
　Authorize a future discount;
END IF
ELSE
Vend the product originally requested;
END IF.

This scheme might be implemented by providing the customer with an alphanumeric coupon code that would be manually entered into the vending machine at a later date in order to redeem the discount. In the preferred embodiment, the offer would be expiring and would include an indication of the expiration date embedded within the code itself, so that a database of such offers need not be maintained, although maintenance of such a database would certainly be possible and feasible. In one embodiment, the vending machine might write the details of the transaction on a magnetic-strip coupon that could be redeemed at a future time by tendering that item to a vending machine designed to read it. Magnetic-strip coupons such as those sold by Coinco under the trademark MAG Coupon would suitable for use with this embodiment.

Preconditions, Overriding Rules, and Default Rules

A vending machine operator might wish to formulate certain rules that would be considered before, or as a part of, every decision rule evaluation. An example of such a rule would be one that considered the availability of the alternate product. That is, an alternate product should not be offered to the customer if the alternative is out of stock in this machine. In order to implement this rule, the usual alternate offer evaluation sequence would preferably be modified as follows:

Choose a RULE associated with the original product selection;
Determine the quantity of alternate product items available;
If the quantity is greater than a predetermined value
Evaluate the RULE and interact with the customer as described previously;
ELSE
Select another alternate product, or
Vend the originally requested product.
END IF.

Thus, availability of the alternate product has been made a precondition to evaluating the selected decision rule. So, if a decision rule would otherwise call for a particular alternative, that alternative will not be presented if it is out of stock.

Additionally, it might be desirable in some settings to formulate an overriding rule that offers a specific alternative no matter what the original selection. In the preferred embodiment, every product in the machine or every designated alternative to the selected product (where the designated alternatives are specified by the vending machine operator) would be implicated by this sort of rule. During the time that an overriding rule is in effect, other rules would be preempted. In most cases, this sort of rule would be limited in time and the vending machine would return to normal rule-based operations on a predetermined future date. As an example of when this sort of rule might be useful, consider the situation where a vending machine contains one or more items of product type A having expiration dates that are imminent. The operator could create an overriding rule that resulted in an offer for product A as an alternate product, no matter what the original selection by the customer. However, this sort of rule would typically be time-limited and the vending machine would typically return to its normal alternate offer rules after all of the product A items had been vended or after the expiration date had passed.

Finally, in some cases a product will not qualify for any specific alternate product offer. In those cases, the vending machine could be programmed to select a default rule/offer combination. Clearly, any rule discussed previously could be designated by the vending machine operator as a default rule. Additionally, though, it will be assumed hereinafter that a "null" rule is always available if an original product selection does not qualify for an alternate offer. A null rule is defined to be associated with every possible initial product selection and is a rule is one that is always "false" when evaluated. Said another way, if the null rule applies, an alternate product offer will never be presented to the customer (i.e. step 515 of FIG. 5 will always take the "NO" branch if the null rule is evaluated). Of course, the null rule is a "rule of last resort" and will only be the chosen rule if there is no other associated rule. In effect, the null rule may also be thought of as the unconditional directive to the CPU 126 to vend (step 550) the originally selected product.

Inventory Database

As should be clear in light of the foregoing, the resolution of many of the decision rules suggested in FIG. 4 requires a knowledge of one or more parameters relating to the vending machine inventory and/or its general operating environment. In the preferred embodiment, this information will be stored within an inventory database 300 (FIG. 2) where it can be accessed by the CPU 126. FIG. 3 has been provided to illustrate some of the various sorts of information that might be stored within this database. The product dispenser identifier field 320 allows the microprocessor 126 to match product selections with other information about the product (e.g., its name, its cost, etc.), and the product dispenser identifier 320 represents the keypad signal corresponding to each corresponding product identified in field 310. Other arrangements and variations are certainly possible.

Additionally, the cost 330 to the vending machine operator of each product type and the cost of that product to the consumer (i.e., the price 340 of the product) are also preferably stored within the inventory database 300. These two values could be used to calculate the profit margin of a product as mentioned previously in connection with Rule 432. However, the profit margin could also be determined by the vending machine operator and stored within the database 300 as a separate parameter.

It is further preferred that some indication of the expiration and/or a restocking date 370 of each product will be stored within database 300. In the case of an expiration date parameter, it is preferred that at least the expiration date of the items that will soonest expire be maintained in the database 300. Note that, in conventional usage an expiration date differs from a restocking date in that a product must be discarded or sold as distressed after its expiration date, whereas a restocking date is normally the next scheduled date when the stock of the vending machine will be replenished. Of course, the values of these two parameters might actually be the same date. However, in other cases they will not be the same, and it might be desirable in those cases to maintain separate database fields for these two parameters. In either case, the current date (as provided, for example, by clock 132) can be used together with the expiration/restocking date parameter 370 to determine how many days remain until the respective event for purposes of rule evaluation. For example, in FIG. 3, if product SNACK 1 (cell 314) was originally stocked on Jan. 20, 1999 and the known expiration interval was 31 days for that type of good, the expiration date could be directly calculated to be Feb. 20, 1999 as is illustrated in cell 374. Clearly, the expiration interval for each type of product could also be readily be made a part of the inventory database 300.

Another parameter that is preferably maintained within the database 300 is the quantity remaining of each product 360. As has been discussed previously, this parameter can be used to determine whether or not an alternate product offer should be presented to the customer. In the preferred embodiment, this database field will be updated by the microprocessor each time a product is dispensed. Of course, when items are added to the vending machine 100 field 360 of the appropriate records are adjusted accordingly. Whether the inventory database 300 is updated automatically or manually when new products are added to the machine is immaterial to the operation of the instant invention and it is well within the ability of one of ordinary skill in the art to devise methods of keeping this database 300 current and accurate.

Still another preferred entry in the database 300 is some estimate of the current demand rate 350 for each type of product in the machine. As used herein, demand rate indicates the quantity of goods sold per unit of time. For example, in FIG. 3, the demand rate in column 350 corresponding to "SNACK 1" is one unit sold per twelve hour period (cell 354). In the preferred embodiment, this value is computed by the CPU 126 using the database 300 to measure inventory changes and the clock 132 to determine the time interval between sales. This approach has the advantage of being responsive to circumstances specific to a particular vending machine. However, it might also be desirable in some applications (say, where there is a cluster of vending machines or where a route of vending machines is being managed) to have the demand rate determined for an entire region by the vending machine operator (or by a central computer). This would allow the vending machine owner to optimize the sales performance of an entire vending machine network, at the possible expense of a few individual machines.

Finally, it should be noted that the inventory database 300 and the alternate product offer database 220 (discussed hereinafter) need not be hierarchical databases, but could instead be simple sequential listings of information (e.g., so-called "flat file" databases). Thus, the term "database" should be construed in its broadest sense to include any arrangement of information containing information that can be accessed by the CPU 126.

Resolving Rule Conflicts

It is certainly possible—and this prospect has been specifically contemplated by the instant inventors—that a product might qualify for multiple alternate product offers. For example, the originally selected product might be (1) in high demand and qualified for an offer suggesting a lower demand item, and also (2) a low margin product that would qualify for an offer presenting a different higher margin alternative. Clearly, there are any number of ways to resolve this situation. For example, when a product qualifies for multiple alternate offers all products that so qualify might be presented either in a single offer (e.g., "HOW ABOUT A OR B OR C INSTEAD?") or one of the alternatives could be selected and presented (e.g., select the product with the highest profit margin). Clearly, many variations are possible and are within the spirit and scope of the present invention.

Another approach would randomly select from among the available alternatives and present the one offer so selected. This approach would have the advantage of spreading the alternate product offers among several products and reduce the risk of causing a single product to experience a rapid decrease in inventory. It would also make it possible to "surprise" the consumer, as he or she might be offered a different alternative each time the same preferred product was selected. Additionally, the next person standing in line might receive a different alternate offer than was presented to the person before him or her. This approach would also help guard against automatic responses by frequent users of a particular vending machine. In a similar vein, a rule could be devised that calls for drawing from a list of associated alternate product offers in a sequential (rather than random)

fashion. This approach would help insure that each product is at least occasionally made the subject of an alternate product offer.

Finally, a rule selection hierarchy may be established that provides a systematic way for the CPU 126 to choose among a plurality of qualifying alternate product offers. In brief, the central idea is that some rules will be designated as being dominant over others. Consider one example of such a rule: if a product qualifies for two alternate product offers, select the alternate product with the higher profit margin. Meta-rules such as this can be used to form a rule selection hierarchy, which permits the CPU 126 to automatically choose one decision rule from among a plurality of qualifying rules according to the needs and wishes of the vending machine operator. A variant of this approach would be to allow scores or weights to be assigned to each rule in the database. This would make it possible for the CPU 126 to select between the qualifying rules on the basis of quantitative criteria established by the owner.

It should be noted, however, that the term "rule selection hierarchy" will be broadly interpreted herein to mean any method by which the CPU 126 can be directed to select among multiple qualifying alternate product offers. This definition would include random and sequential selection as described above.

Conclusion

Although the previous language has been couched generally in terms of decision rules as applied to a single vending machine, it should be noted that the instant methods are applicable to networks of vending machines. By formulating rules that are applied within every machine in a network, a vending machine operator may even devise global strategies for increasing the profits obtained from their sales.

Additionally, given the widespread availability of wireless and land-based communications pathways, it should be apparent that multiple vending machines could be controlled by a single CPU 126 situated in a location remote from the vending site. In that case, there may be additional interconnections (not shown) between the CPU 126 and the other vending machines to read from and/or control change dispensers 118, bill reader/validators 114, item dispensers 122, output devices 124, etc. Further, the communications links illustrated in FIG. 2 between the CPU 126 and the various devices that it reads and/or controls could be made via network connections, allowing the CPU 126 to be potentially located anywhere in the world. Design of such an arrangement would be well within the ability of one of ordinary skill in the art.

Thus, it is apparent that there has been provided, in accordance with the invention, a vending machine system and apparatus that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of automatically dispensing a product to a customer, comprising the steps of:
   (a) receiving a product selection from the customer;
   (b) determining whether said product selection qualifies for an alternate product offer by:
      (b1) choosing an alternate product,
      (b2) determining an acceptance rate of said chosen alternate product in relation to said product selection, and,
      (b3) determining whether said product selection qualifies for an alternate product offer based on said acceptance rate;
   (c) presenting an alternate product offer message if said product selection so qualifies;
   (d) determining if the customer has accepted said alternate product offer; and,
   (e) dispensing a first product that corresponds to said alternate product offer if the customer has so accepted, or,
   (f) dispensing a second product that corresponds to said product selection if the customer has not so accepted.

2. A method according to claim 1, wherein step (b3) includes the step of:
   (i) determining that said product selection qualifies for an alternate product offer if said acceptance rate is greater than a predetermined value.

3. A method of automatically dispensing a product to a customer, comprising the steps of:
   (a) receiving a product selection from the customer wherein there is a profit margin associated with said product selection;
   (b) determining whether said product selection qualifies for an alternate product offer by:
      (b1) choosing an alternate product,
      (b2) obtaining a profit margin associated with said alternate product, and,
      (b3) determining that said product selection qualifies for an alternate product offer if said alternate product profit margin is greater than said profit margin associated with said product selection;
   (c) presenting an alternate product offer message if said product selection so qualifies;
   (d) determining if the customer has accepted said alternate product offer; and,
   (e) dispensing a first product that corresponds to said alternate product offer if the customer has so accepted, or,
   (f) dispensing a second product that corresponds to said product selection if the customer has not so accepted.

4. A method according to claim 3, wherein there is at least one product item associated with said chosen alternate product, wherein each of said at least one product item associated with said chosen alternate product has an expiration date, and, wherein said profit margin associated with said alternate product is chosen to be a function of said expiration date.

5. A method of automatically dispensing a product to a customer, comprising the steps of:
   (a) receiving a product selection from the customer;
   (b) determining whether said product selection qualifies for an alternate product offer by:
      (b1) determining a demand rate for said product selection,
      (b2) choosing an alternate product,
      (b3) determining a demand rate for said alternate product,
      (b4) comparing said demand rate for said product selection and said demand rate for said alternate product, and,
      (b5) determining based on said step of comparing whether said product selection qualifies for an alternate product offer;

(c) presenting an alternate product offer message if said product selection so qualifies;
(d) determining if the customer has accepted said alternate product offer; and,
(e) dispensing a first product that corresponds to said alternate product offer if the customer has so accepted, or,
(f) dispensing a second product that corresponds to said product selection if the customer has not so accepted.

6. A method of automatically dispensing a product to a customer, comprising the steps of:
(a) receiving a product selection from the customer;
(b) determining whether said product selection qualifies for an alternate product offer by:
(b1) selecting an alternate product,
(b2) determining a demand rate for said product selection,
(b3) comparing said demand rate with a predetermined rate, and,
(b4) determining based on said step of comparing whether said product selection qualifies for an alternate product offer;
(c) presenting an alternate product offer message if said product selection so qualifies;
(d) determining if the customer has accepted said alternate product offer; and,
(e) dispensing a first product that corresponds to said alternate product offer if the customer has so accepted, or,
(f) dispensing a second product that corresponds to said product selection if the customer has not so accepted.

7. A method of automatically dispensing a product to a customer, comprising the steps of:
(a) receiving a product selection from the customer;
(b) determining whether said product selection qualifies for an alternate product offer;
(c) presenting an alternate product offer message if said product selection so qualifies, by:
(c1) selecting a plurality of products, each of said plurality of products having a profit margin associated therewith,
(c2) determining which of said associated profit margins is a largest profit margin,
(c3) identifying which of said plurality of products is associated with said largest profit margin,
(c4) selecting for presentation in an alternate product offer message any product so identified, and,
(c5) presenting said alternate product offer message if said product selection so qualifies;
(d) determining if the customer has accepted said alternate product offer; and,
(e) dispensing a first product that corresponds to said alternate product offer if the customer has so accepted, or,
(f) dispensing a second product that corresponds to said product selection if the customer has not so accepted.

8. A method comprising:
receiving a selection of a first product from a vending machine;
presenting an offer for a second product in lieu of the first product, in which the second product is more profitable than the first product;
determining if the customer has accepted the offer; and
dispensing the second product if the customer has accepted the offer.

9. A method comprising:
receiving a selection of a first product from a vending machine;
determining a profit margin of the first product;
determining a second product that has a profit margin greater than the profit margin of the first product;
displaying an offer to for the second product instead of the first product;
receiving an acceptance of the offer; and
dispensing the second product.

10. A method, comprising:
receiving, by a vending machine, an indication of a customer selection of a product offered for sale by the vending machine;
receiving, by the vending machine, an indication of an amount of funds provided by the customer;
determining, after the receiving of the indication of the customer selection of the product, and by a processor of the vending machine, an alternate product offer rule associated with the selected product, wherein the alternate product offer rule comprises a rule that the selected product be associated with a demand that is greater than a pre-defined threshold for demand;
determining, by the processing device of the vending machine, that the alternate product offer rule is satisfied;
providing, to the customer and by the vending machine, an offer for an alternate product associated with the alternate product offer rule, instead of the selected product in exchange for the funds provided by the customer;
determining, by the processing device of the vending machine, an acceptance, by the customer, of the offer for the alternate product; and
dispensing, by the vending machine, and after the determination of the acceptance of the alternate product offer by the customer, the alternate product to the customer.

11. A method, comprising:
receiving, by a vending machine, an indication of a customer selection of a product offered for sale by the vending machine;
receiving, by the vending machine, an indication of an amount of funds provided by the customer;
determining, after the receiving of the indication of the customer selection of the product, and by a processor of the vending machine, an alternate product that is associated with the lowest demand of all products offered for sale by the vending machine;
providing, to the customer and by the vending machine, an offer for the alternate product;
determining, by the processing device of the vending machine, an acceptance, by the customer, of the offer for the alternate product; and
dispensing, by the vending machine, and after the determination of the acceptance of the alternate product offer by the customer, the alternate product to the customer.

* * * * *